(12) United States Patent
Havre

(10) Patent No.: US 7,704,179 B2
(45) Date of Patent: Apr. 27, 2010

(54) DEVICE FOR TRANSMISSION OF A TORQUE

(76) Inventor: Bard Havre, Nedre Prinsdalsvei 39A, Oslo (NO) N-1263

(*) Notice: Subject to any disclaimer, the term of this patent is extended or adjusted under 35 U.S.C. 154(b) by 367 days.

(21) Appl. No.: 11/914,136

(22) PCT Filed: Jun. 7, 2006

(86) PCT No.: PCT/NO2006/000212

§ 371 (c)(1),
(2), (4) Date: Nov. 11, 2007

(87) PCT Pub. No.: WO2006/132543

PCT Pub. Date: Dec. 14, 2006

(65) Prior Publication Data

US 2009/0131211 A1     May 21, 2009

(30) Foreign Application Priority Data

Jun. 8, 2005    (NO) .................................. 20052762

(51) Int. Cl.
*F16H 1/32* (2006.01)
(52) U.S. Cl. ..................................... 475/162
(58) Field of Classification Search .................. 475/162, 475/178
See application file for complete search history.

(56) References Cited

U.S. PATENT DOCUMENTS

| | | | | | |
|---|---|---|---|---|---|
| 3,283,597 | A | * | 11/1966 | Doll | 74/63 |
| 3,468,175 | A | * | 9/1969 | Rabek | 74/63 |
| 3,529,480 | A | * | 9/1970 | Kaspareck | 74/63 |
| 4,798,104 | A | * | 1/1989 | Chen et al. | 74/63 |
| 5,351,568 | A | * | 10/1994 | Feterl | 74/63 |
| 6,416,438 | B1 | | 7/2002 | Choi et al. | |

FOREIGN PATENT DOCUMENTS

| | | |
|---|---|---|
| DE | 19738107 A1 | 3/1999 |
| WO | 2004090377 A1 | 10/2004 |

* cited by examiner

*Primary Examiner*—Dirk Wright
(74) *Attorney, Agent, or Firm*—David A. Guerra

(57) ABSTRACT

Fluid-tight transmission comprising an internal cogwheel (19) with N-n teeth in cooperation with an external cogwheel (29) with N teeth. The internal cogwheel (1) is drivingly influenced by an eccentric (7; 17) via radially arranged push rods (10) encapsulated in respective bellows (12). The bellows are closely connected with a housing (3) comprising the external cogwheel (2). A fluid-tight barrier is thereby formed between a first rotatable element (8; 16), which drives the eccentric (7; 17), and a second rotatable element (14).

5 Claims, 2 Drawing Sheets ically available gears exist where this principle is employed.
DEVICE FOR TRANSMISSION OF A TORQUE The invention relates to a device for transmission of a torque as indicated in the introduction to claim 1.

The invention has been developed particularly in order to provide a gastight transmission for use in operating devices for valves, but is not limited to such use.

The actuation of various types of valves requires sealing in order to eliminate leakages which otherwise commonly occur along the valve stem and to prevent emission of environmental toxins etc. In many cases sealing is also important for preventing the risk of explosion. When using underwater equipment, for example, it may be expedient to take into account the high pressures usually encountered there when designing the transmission.

The invention aims to meet these requirements.

According to the invention, therefore, a fluid-tight transmission is proposed, particularly for actuating valves, more specifically a device as indicated in claim 1. Further features of the invention are indicated in the dependent claims.

By establishing a fluid-tight barrier between, for example, the actuating body for a valve and the valve body that has to be actuated, by employing radial rods or plungers encapsulated in respective bellows, the use of rotating seals round the valve stem is avoided, and a static seal is obtained with flexible bellows which only have to absorb small movements.

The relatively small bellows can be easily designed for high pressures, e.g. up to 100 bar or more.

Figure 1:
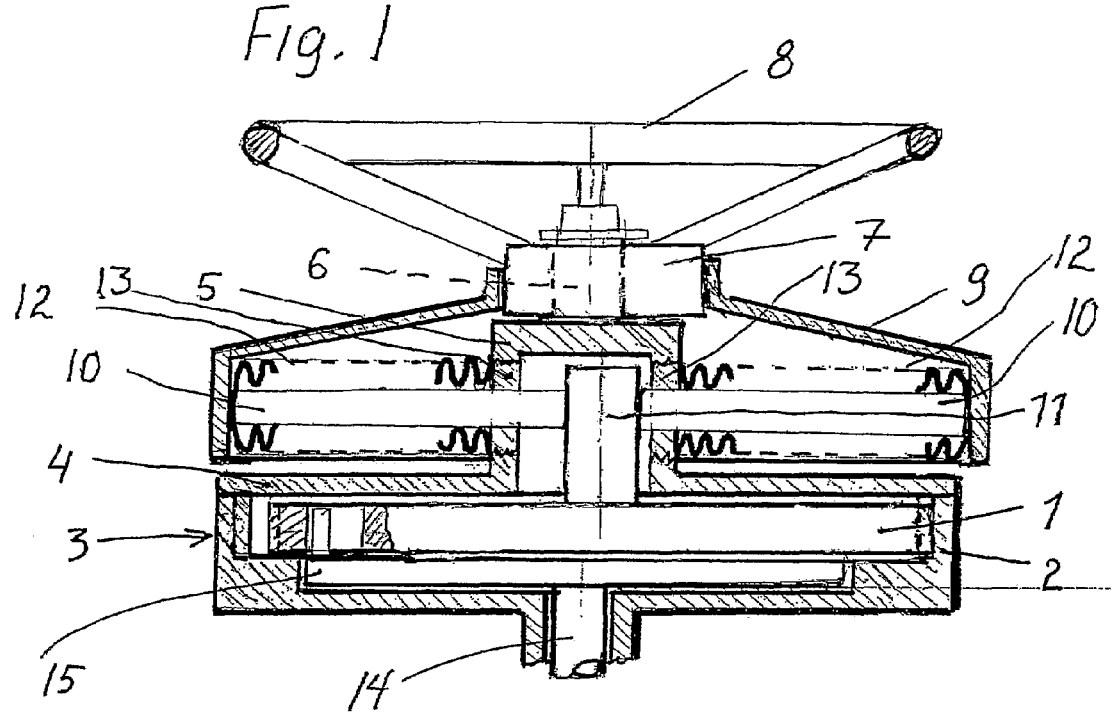
Figure 2:
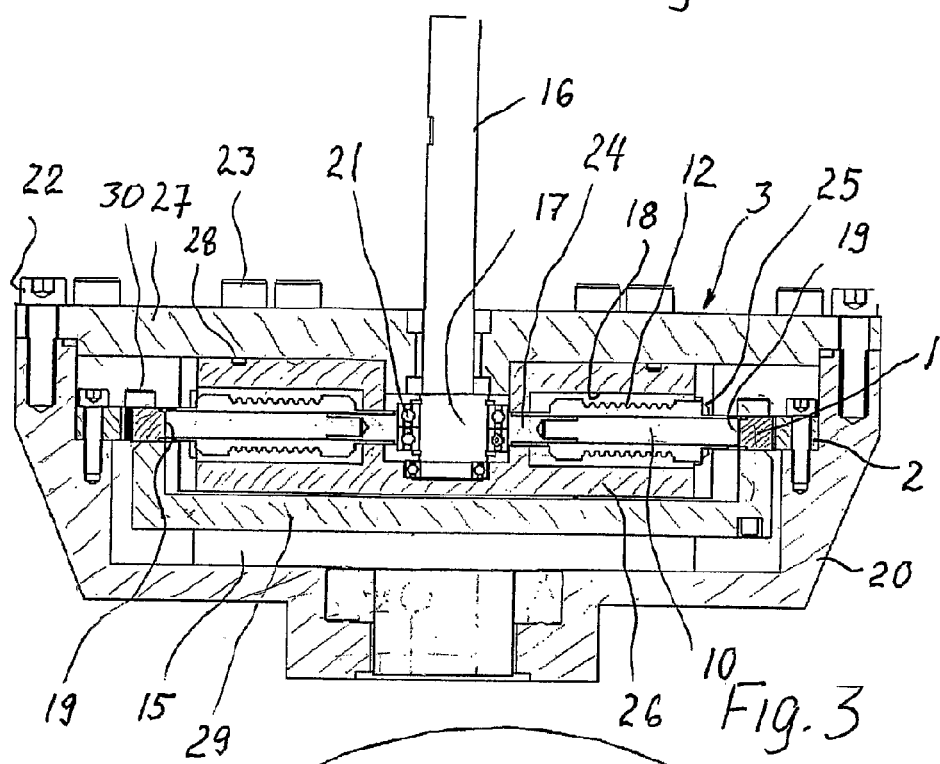
Figure 3:
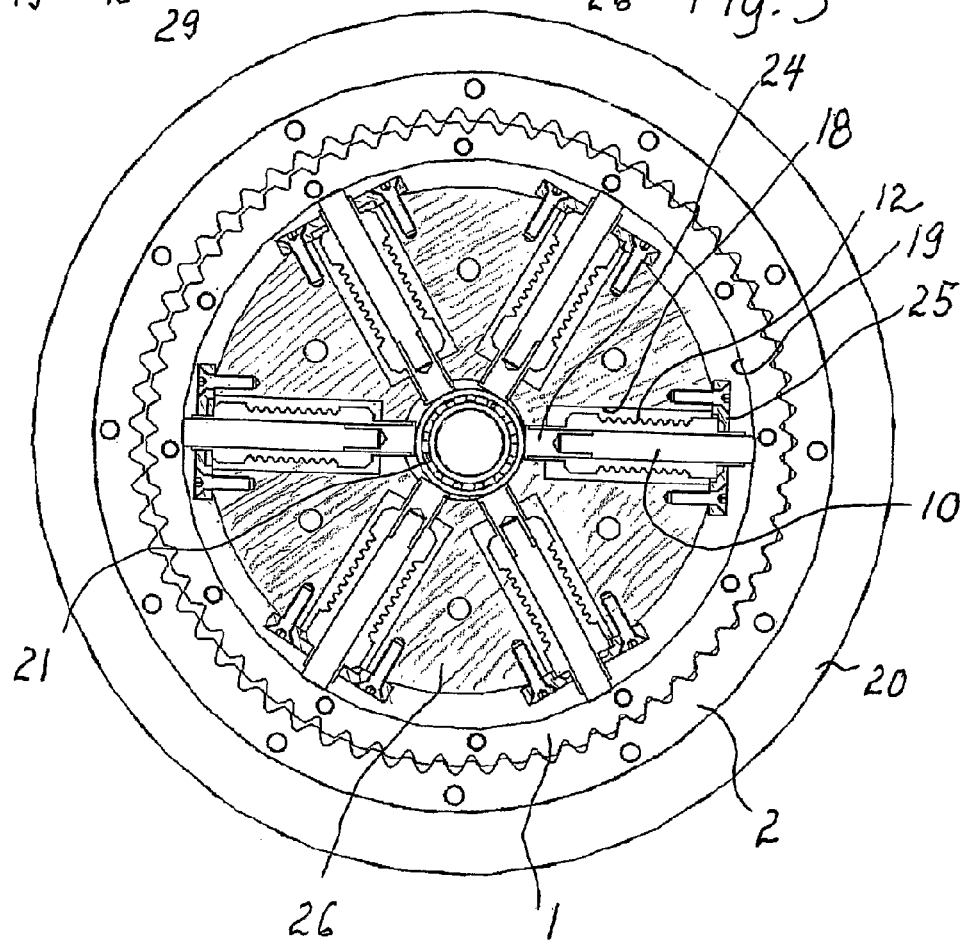

The invention will now be described in greater detail, with reference to the drawing, which illustrates embodiments of the invention in the actuating body for valves, and in which FIG. 1 is a schematic section through a gastight transmission according to the invention, FIG. 2 is a schematic section through a second embodiment of a gastight transmission according to the invention, and FIG. 3 is a section through the embodiment in FIG. 2.

The gastight transmissions illustrated in FIGS. 1 and 2, 3 are based on the use of a planetary gear-like construction, where an internal cogwheel 1 with a number of teeth N-n, where n is a small number, usually 1, rotates within an external cogwheel (gear rim) 2 with a number of teeth N. The rotation is produced by the internal cogwheel 1 being given an eccentric motion, which forces the cogwheel to roll round the inner circumference of the external cogwheel. The rotation constitutes n tooth widths per 360 degrees of the eccentric motion's rotation, and is in the opposite direction. Commercially available gears exist where this principle is employed. They are characterised by a high degree of rigidity and low slip, and are used in the field of robotics amongst other things.

The two cogwheels 1 and 2 are mounted in a housing 3, which in FIG. 1 comprises the external cogwheel 2. In the embodiment in FIG. 1 there is mounted on the gear rim, i.e. the external cogwheel, a cover 4 which has a central hollow trunnion 5 with a protruding spigot 6. The spigot 6 provides the mounting for an eccentric 7 which can be rotated by a wheel 8. The eccentric 7 interacts with an inverted saucer-shaped transmission element 9 which in turn influences push rods 10 which extend radially inwards to abut against a central, axial protrusion 11 on the internal cogwheel 1. Each push rod 10 (plunger), there being at least three push rods, is encapsulated in a respective bellows 12 which is closely connected to the housing 3, in this case the hollow trunnion 5. The individual push rod 10 passes through a screw plug 13 in the hollow trunnion 5 to abutment with the protrusion 11.

When the wheel 8 is rotated, for actuating a valve not illustrated here, via the transmission element 9 the eccentric 7 will effect a transmission of the eccentric motion from one side of the fluid-tight barrier formed by the bellows 12 to the other.

From the internal cogwheel 1 the rotation is transmitted to the valve stem 14 via a crank slide mechanism 15.

FIGS. 2 and 3 depict an embodiment of the gastight transmission according to the invention which is "inverse" relative to FIG. 1. A rotational movement of the operating stem 16 with associated rotation of the eccentric 17 will via the ball bearings 21 influence the push rods 10 which are encapsulated in a respective bellows 12.

The bellows-push rod units 10, 12 are mounted in radial bores 18 in the housing 3, or more precisely a part 26 which is closely connected to a top cover 27 by screws 23 and inlaid O-rings 28. The top cover 27 is fixed to a saucer-shaped part 20, in which the external cogwheel 2 is inserted and screwed. Under the influence of the eccentric 17, the push rods 10 will move towards an inner wall 19 in the internal cogwheel 1, which is mounted on a carrier 29 by indicated screws 30, thereby transmitting the eccentric motion to the other side of the fluid-tight barrier formed by the bellows 12. As mentioned above, the bellows 12 are closely connected to the housing 3, i.e. the part 26. The individual bellows 12 is connected at the outside with the part 26 by a plate or flange 25 which is screwed to the part 26. Each push rod 10 is in contact with the eccentric 17 via the ball bearings 21 with a transition piece 24.

The internal cogwheel 1, i.e. the carrier 29, is also transmission-coupled 15 here by a non-illustrated valve stem. A person skilled in the art will know that many different types of connectors may be employed here instead of only the connector 15 exemplified in FIG. 1.

As already mentioned, with the invention the object is achieved that a barrier is established which permits motion transmission without dynamic seals. Instead, use is made of a flexible bellows/membrane structure which only has to compensate for the linear movements of the push rods caused by the eccentric. The bellows/membranes may be made of metal, plastic, rubber or another suitable material. The fact that the bellows may be small, and that the movements follow the bellows' main axis, means that the bellows can withstand substantially high pressures if necessary. This permits them to be utilised for actuating valves with stringent requirements with regard to emissions since the traditional emissions along the valve stem are eliminated. They may furthermore be used in underwater equipment or equipment where high pressures are encountered.

The invention claimed is:

1. A device for transmission of a torque between two rotatable elements (8; 16, 14), comprising an internal cogwheel (1) with N-n teeth engaged with an external cogwheel (2) with N teeth in a housing (3), where a first rotatable element (8; 16) with an eccentric (7; 17) is transmission-coupled to the internal cogwheel (1), characterised in that the eccentric (7; 17) influenced radial pressure-exchanging means (10) which have contact with a rotationally symmetrical portion (11; 19) of the internal cogwheel (1) through a housing wall, where each pressure-exchanging means (10) is encapsulated in a bellows (12) which is closely connected to the housing (3), constituting and forming a respective part of the fluid-tight barrier.

2. A device according to claim 1,
characterised in that the radial, pressure-exchanging means are in the form of push rods or plungers (10).

3. A device according to claim 1 or 2,
characterised in that the rotationally symmetrical portion is a centrally axial protrusion (11) on the internal cogwheel (1).

4. A device according to claim 1 or 2,
characterised in that the rotationally symmetrical portion is an internal wall (19) in the internal cogwheel (1).

5. The use of a device according to the preceding claim as fluid-tight transmission in an actuating body for a valve.

\* \* \* \* \*